United States Patent
Bellus et al.

(10) Patent No.: US 6,403,026 B1
(45) Date of Patent: Jun. 11, 2002

(54) STEEL AND PROCESS FOR THE MANUFACTURE OF A COMPONENT FOR BEARINGS

(75) Inventors: Jacques Bellus, Scy-Chazelles; Gilles Baudry, Ban Saint Martin; Gilles Dudragne, Alby sur Cheran; Daniel Girodin, Marcellaz Albanais; Gérard Jacob, Montbard; Alain Vincent, Manissieux Saint Priest; Gérard Lormand, Villeurbanne, all of (FR)

(73) Assignees: Ascometal, Puteaux; S.N.R. Roulements, Annecy; Valti Societe Anonyme pour la Fabrication de Tubes Roulements, Montbard, all of (FR)

( * ) Notice: Subject to any disclaimer, the term of this patent is extended or adjusted under 35 U.S.C. 154(b) by 0 days.

(21) Appl. No.: 09/615,713

(22) Filed: Jul. 13, 2000

Related U.S. Application Data

(63) Continuation of application No. 09/055,357, filed on Apr. 6, 1998, now Pat. No. 6,162,390.

(30) Foreign Application Priority Data

Apr. 4, 1997 (FR) .............................. 97 04092

(51) Int. Cl.$^7$ .............................. C21D 8/00; C21D 9/36; C21D 9/40; C22C 38/18
(52) U.S. Cl. .................. 420/100; 420/104; 148/906; 148/659; 148/652; 148/654; 148/333; 384/492; 384/912
(58) Field of Search ................................. 420/100, 101, 420/104, 105, 108; 148/652, 654, 659, 906, 333, 334, 335, 336; 384/492, 912

(56) References Cited

U.S. PATENT DOCUMENTS 3,663,314 A * 5/1972 Monma et al. ............. 148/659

* cited by examiner

Primary Examiner—Deborah Yee
(74) Attorney, Agent, or Firm—Oblon, Spivak, McClelland, Maier & Neustadt, P.C.

(57) ABSTRACT

Steel for the manufacture of a component for bearings, the chemical composition of which comprises, by weight: $0.6\% \leq C \leq 1.5\%$; $0.4\% \leq Mn \leq 1.5\%$; $0.75\% \leq Si \leq 2.5\%$, $0.2\% \leq Cr \leq 2\%$; $0\% \leq Ni \leq 0.5\%$; $0\% \leq Mo \leq 0.2\%$; $0\% \leq Al \leq 0.05\%$; $S \leq 0.04\%$; the balance being iron and impurities resulting from smelting and the composition furthermore satisfying the relationships: $Mn \leq 0.75 + 0.55 \times Si$ and $Mn \leq 2.5 - 0.8 \times Si$. Process for the manufacture of a bearing component.

12 Claims, No Drawings

STEEL AND PROCESS FOR THE MANUFACTURE OF A COMPONENT FOR BEARINGS

This application is a continuation of application Ser. No. 09/055,357 filed on Apr. 6, 1998 now U.S. Pat. No. 6,162,390 issued Dec. 19, 2000.

BACKGROUND OF THE INVENTION

1. Field of the Invention

The present invention relates to steel particularly suited for both general use and the manufacture of a component for bearings, especially a race for ball bearings, needle bearings or roller bearings.

2. Background of the Invention

Components for bearings, such as races, balls, needles or rollers, are generally manufactured from steel of the 100Cr6 or 100CrMn6 type containing from 0.6 to 1.5% of carbon, from 1.3 to 1.6% of chromium, from 0.3 to 1% of manganese and less than 0.4% of silicon and having a very high degree of cleanliness in terms of inclusions. The steel is used in the form of rolled bar, seamless tube or wire, from which are cut blanks or slugs which are formed by cold or hot plastic deformation and then hardened by tempering and annealing, before being machined. The components thus obtained have a high hardness and the toughness required for them to be able to withstand the rolling fatigue well, at least under the normal conditions of use, especially for in-service temperatures below 150° C. However, the components thus formed have an insufficient rolling fatigue resistance for more severe service conditions, which are tending to become common. These more severe service conditions are characterized, in particular, by a service temperature above 150° C. and possibly as high as 350° C., and/or by the presence of the phenomenon of bearing surface deterioration by indentation. This phenomenon consists of the initiation of cracks on the surface, caused by the indentations, i.e. deformations generated by hard particles present in the lubricant.

In order to limit the effect of the indentation, it has been proposed to use materials having a very high hardness such as ceramics or deposits of hard materials. However, this technique has the drawback of being not very reliable because of the excessively high brittleness of these materials, which brittleness makes them very sensitive to the slightest defect.

It has also been proposed, for example in U.S. Pat. No. 5,030,017, to use a steel containing, in particular, from 0.3% to 0.6% of carbon, from 3% to 14% of chromium, from 0.4% to 2% of molybdenum, from 0.3% to 1% of vanadium and less than 2% of manganese. The components are carburized or carbonitrided in the region of the bearing surface, so as to obtain a sum of the carbon and nitrogen contents of between 0.03% and 1%, and are then hardened so that their micrographic structure comprises from 20% to 50% (in % by volume) of residual austenite in a surface layer representing from 10% to 25% of the volume of the component. This technique has the double drawback of requiring the use of a steel which is highly loaded with alloying elements, and is hence expensive, and the execution of a carburizing or carbonitriding treatment, this treatment being lengthy and expensive.

It has also been proposed, in German Patent Application DE 195 24 957, to use a steel containing from 0.9% to 1.3% of carbon, from 0.6% to 1.2% of silicon, from 1.1% to 1.6% of manganese and from 1.3% to 1.7% of chromium, the balance being iron and impurities resulting from smelting, the structure of this steel containing from 7% to 25% of residual austenite. However, this steel, because of its chemical composition, provides no guarantee of castability; of cold deformability and of residual austenite content and stability. The specified residual austenite content necessary for improving the resistance to indentation fatigue moreover requires, in the case of this steel, subjecting the bearings to a not very convenient heat treatment comprising a step of holding them at approximately 100° C. for more than 10 hours between tempering and annealing without returning to ambient temperature after tempering or before annealing. Moreover, in the presence of multidirectional stresses below the cyclic yield stress, its austenite is stable for more than 2000 hours only for thermal stresses below 120° C., which is too low for some applications.

SUMMARY OF THE INVENTION

The object of the present invention is to remedy these drawbacks by providing a means for manufacturing, in an economical manner and especially using a relatively standard heat treatment, a component for bearings which is resistant to indentation, in particular when they are used briefly or occasionally above 300° C., and is not very brittle.

For this purpose, the subject of the invention is a steel useful generaly and for the manufacture of a component for bearings, the chemical composition of which comprises, by weight:

$0.6\% \leq C \leq 1.5\%$ $0.4\% \leq Mn \leq 1.5\%$ $0.75\% \leq Si \leq 2.5\%$ $0.2\% \leq Cr \leq 2\%$ $0\% \leq Ni \leq 0.5\%$ $0\% \leq Mo \leq 0.2\%$ $0\% < Al \leq 0.05\%$ $0\% < Ti \leq 0.04\%$ $S \leq 0.04\%$ the balance being iron and impurities resulting from smelting, the composition furthermore satisfying the relationships:

$$Mn \leq 0.75 + 0.55 \times Si$$

$$Mn \leq 2.5 - 0.8 \times Si$$

Preferably, the chemical composition of the steel is such that, separately or better still at the same time, on the one hand:

$0.8\% \leq Mn \leq 1.2\%$ $0.8\% \leq Si \leq 1.7\%$ and, on the other hand:

$0.9\% \leq C \leq 1.1\%$ $1.3\% \leq Cr \leq 1.6\%$

Also preferably, the silicon content is greater than 1.2%; the inventors have, in fact, surprisingly observed that, when simultaneously the silicon content is greater than 1.2% and the manganese content is less than 1.5%, and preferably less than 1.2% but greater than 0.8%, the stability of the austenite is very substantially improved.

The invention also relates to a process for the manufacture of a component for bearings, in which:

a semi-finished product made of steel according to the invention is provided;

the semi-finished product is formed by hot plastic deformation so as to obtain a product blank and, more particularly, a seamless-tube blank a spheroidizing treatment is carried out on the product blank, this treatment comprising heating to a temperature of between 750° C. and 850° C. followed by cooling, the maximum rate of which is 10° C./hour, down to 650° C. so as to obtain a structure having a hardness of less than 270 HV and comprising a fine dispersion of carbides, and optionally, forming by cold plastic deformation, for example cold rolling or cold drawing so as to obtain a product;

the product is cut in order to obtain a section which is formed by cold or hot plastic deformation, or by machining, so as to obtain a component blank for bearings; and the component blank for bearings is subjected to a hardening heat treatment by cooling, for example in oil, after austenization between 800° C. and 950° C. and to an annealing heat treatment between 100° C. and 400° C. and preferably below 250° C., so as to obtain a component for bearings which has a structure whose hardness is between 58 HRC and 67 HRC and which consists of residual carbides, martensite and from 5% to 30% of residual austenite.

Finally, the invention relates, on the one hand, to a seamless tube made of steel according to the invention and, on the other hand, to a component for bearings made of steel according to the invention having a structure consisting of residual carbides, martensite and from 5% to 30% of residual austenite thermally stable up to 400° C. at least.

DESCRIPTION OF THE PREFERRED EMBODIMENTS

The invention will now be described in greater detail, but in a non-limiting manner, and illustrated by examples.

In order to manufacture a bearing component, such as a race or a rolling body having a good resistance to indentation, for example from a seamless tube, a steel is used whose chemical composition comprises, by weight:

more than 0.6% and preferably more than 0.9% of carbon in order to obtain a sufficient hardness and a sufficient degree of residual austenite, but less than 1.5% and preferably less than 1.1% in order to avoid the formation of excessive segregation and to limit the formation of primary carbides;

more than 0.75% and preferably more than 0.8%, better still more than 1.2% silicon so as to increase the hot stability of the residual austenite (between 170° C. and 450° C. approximately and preferably above 300° C.) and the hardness, but less than 2.5% and preferably less than 1.7% since, when the silicon content is too high, the steel becomes too brittle, especially for being able to be formed by plastic deformation;

more than 0.4% of manganese and preferably more than 0.8% in order to be able to obtain a hardened structure having a residual austenite content greater than 5% and preferably greater than 15%; the manganese content must be such that: Mn≦0.75+0.55×Si in order to obtain good castability without which it becomes difficult to obtain a sufficiently clean steel so that it has a good resistance to rolling fatigue, and such that: Mn≦2.5−0.8×Si in order to allow finishing operations and forming by cold plastic deformation; it follows from these relationships that the manganese content must be less than 1.5% and it is preferable for it to be less than 1.2%;

from 0.2% to 2% of chromium, and preferably from 1.3% to 1.6%, so as, on the one hand, to obtain sufficient hardenability and, on the other hand, to form seeds of spheroidal carbides with a size of less than 2 μm which are uniformly distributed and in sufficient quantity;

less than 0.5% of nickel, which residual element is not absolutely essential but which has a favorable effect on the hardenability;

less than 0.2% of molybdenum, which element slows down the rate of softening during annealing;

between 0% and 0.05% of aluminium and less than 0.04% of sulfur, the balance being iron and impurities resulting from smelting.

This steel is cast and, optionally, rolled in order to manufacture a semi-finished product which, when it is desired to manufacture a race from a seamless tube, is a tube round.

The semi-finished product is then formed by hot plastic deformation in order to obtain a product blank, for example by hot rolling in order to obtain a seamless tube.

The product blank is then subjected to a spheroidizing heat treatment consisting of heating to a temperature of between 750° C. and 850° C. followed by cooling, the maximum rate of which is 10° C./hour, down to 650° C. so as to obtain a structure having a hardness of less than 270 HV and comprising a fine dispersion of carbides. This heat treatment is necessary so that the steel has a good capability of being formed by cold plastic deformation and a good machinability, the process used to manufacture a product, for example by cold rolling or by cold drawing. This product, which may be a seamless tube, is characterized in that it is well gaged. It is used to manufacture the blanks for components, for example the blanks for bearing races.

The manufacture of the component blanks, which is carried out by the cold or hot forming or machining of sections cut from the product, ends in a heat treatment consisting of hardening by tempering and annealing. A component for bearings is thus obtained. The prehardening austenization temperature, greater than 800° C., is adjusted so as to obtain, after hardening, a structure consisting of martensite, from 5% to 30% of residual austenite and a network of residual carbides. The degree of residual austenite, the presence of which is essential for obtaining good resistance to indentation, depends on the value of the MS point (martensitic transformation start temperature) which itself depends both on the composition of the steel and on the austenization conditions. The person skilled in the art knows how to determine these parameters, for example using dilatometric tests. The annealing, which is more exactly a stress relieving, is carried out by heating above 100° C. so as to stabilize the structure, but below 400° C. and preferably below 250° C. in order to destabilize the residual austenite.

By way of a first example, 10 laboratory castings are produced, 2 according to the invention (labelled A and B) and 8 by way of comparison (labelled C, D, E, F, G, H; I and J). These castings, to which the standard 100Cr6 was added, which are essentially intended to demonstrate the effect of the alloying elements on the various properties of a bearing steel, had the following chemical compositions (in % by weight; only the main elements are indicated, the balance being iron and impurities):

|   | C | Si | Mn | Ni | Cr | Mo | Al | S |
|---|---|----|----|----|----|----|----|----|
| A | 0.957 | 1.508 | 1.006 | 0.138 | 1.632 | 0.019 | 0.033 | 0.008 |
| B | 0.972 | 1.080 | 1.100 | 0.161 | 1.520 | 0.023 | 0.038 | 0.010 |

-continued

|   | C | Si | Mn | Ni | Cr | Mo | Al | S |
|---|---|----|----|----|----|----|----|----|
| C | 0.950 | 2.501 | 1.016 | 0.132 | 1.571 | 0.021 | 0.034 | 0.007 |
| D | 0.959 | 2.508 | 2.074 | 0.126 | 1.607 | 0.021 | 0.033 | 0.007 |
| E | 0.938 | 0.446 | 2.110 | 0.129 | 1.605 | 0.020 | 0.035 | 0.008 |
| F | 0.972 | 1.509 | 2.045 | 0.124 | 1.539 | 0.019 | 0.032 | 0.008 |
| G | 0.950 | 1.513 | 0.263 | 0.131 | 1.570 | 0.020 | 0.027 | 0.006 |
| H | 0.952 | 0.501 | 1.022 | 0.139 | 1.606 | 0.021 | 0.022 | 0.004 |
| I | 0.985 | 1.040 | 0.345 | 0.149 | 1.490 | 0.017 | 0.032 | 0.009 |
| J | 0.966 | 2.060 | 0.297 | 0.159 | 1.520 | 0.019 | 0.038 | 0.006 |
| 100Cr6 | 1.000 | 0.200 | 0.300 | — | 1.500 | — | — | — |

These steels were cast in the form of 65 kg ingots which were forged in order to form square bars of side 20 mm and then spheroidized by holding them for 1 hour at 30° C. above the pearlite-to-austenite transformation finish temperature followed by cooling down to 650° C. at a rate of between 8 and 10° C. per hour and completed by cooling in air down to ambient temperature. The cold deformability has, in this case, been evaluated by measuring the toughness Kcu at 60° C. expressed in daJ/cm$^2$; when this toughness is greater than 4.2 daJ/cm$^2$, the cold formability is good and is poor in the opposite case. The ingots were subsequently hardened in cold oil, after austenization at 895° C., and, on the one hand, the degree τ of residual austenite and, on the other hand, the residual austenite destabilization start temperature θ (were measured. The castability was also evaluated. The results were as follows:

|   | Si (%) | Mn (%) | 0.75 + 0.55 Si | Cast-abil-ity | 2.5 – 0.8 Si | KCU to 60° C. daJ/cm$^2$ | τ | θ |
|---|--------|--------|----------------|---------------|--------------|--------------------------|---|---|
| A | 1.508 | 1.006 | 1.579 | good | 1.294 | 4.2 | 14% | 390° C. |
| B | 1.080 | 1.100 | 1.344 | good | 1.636 | 5.5 | 17% | 400° C. |
| C | 2.501 | 1.016 | 2.125 | good | 0.499 | 1.3 | 15% | 405° C. |
| D | 2.508 | 2.074 | 2.129 | good | 0.494 | 0.5 | 19% | 440° C. |
| E | 0.446 | 2.110 | 0.995 | poor | 2.143 | 5.6 | nd | 260° C. |
| F | 1.509 | 2.045 | 1.580 | poor | 1.293 | 2.1 | 22% | 410° C. |
| G | 1.513 | 0.263 | 1.582 | good | 1.290 | 4.6 | 9% | 350° C. |
| H | 0.501 | 1.022 | 1.025 | good | 2.099 | 6.7 | 9% | 225° C. |
| I | 1.040 | 0.345 | 1.322 | good | 1.668 | 6.0 | 14% | nd |
| J | 2.060 | 0.297 | 1.883 | good | 0.852 | 4.4 | 12% | nd |
| 100Cr6 | 0.200 | 0.300 | 0.86 | good | 2.34 | 6.6 | 7% | 170° C. |

These results show that only the heats A and B according to the invention combine all the desired properties, namely good castability, good cold deformability, a high degree of residual austenite and a stable structure up to high temperatures, the latter two characteristics being substantially superior to the corresponding characteristics of the standard 100Cr6.

In addition, residual austenite stability tests, under monotonic stress and in cyclic compression, showed that:

for the heats with a silicon content greater than 1%, the residual austenite remains stable when it is subjected by compression to an equivalent shear stress of 1400 MPa while, under the same conditions, 50% of the residual austenite of a 100Cr6 steel (containing less than 0.5% of Si) is destabilized; and in the case of the residual austenite destabilization tests in cyclic compression (equivalent shear stress varying between 25 MPa and 1025 MPa at a frequency of 200 Hz), no destabilization occurred after 1 million cycles for a heat containing approximately 1% of manganese and 1.5% of silicon (heat A).

By way of a second example, an industrial heat of a steel according to the invention was produced, from which a race for bearings was manufactured. The chemical composition of the steel comprised, by weight:

C=0.9%

Si=1.25%

Mn=1%

Cr=1.4%

Ni=0.25%

Mo=0.015% the balance being iron and impurities resulting from smelting.

This steel was cast and rolled in the form of a tube round 100 mm in diameter.

The tube round was hot pierced between two rolls and then hot rolled in order to obtain a seamless-tube blank having an external diameter of 67.5 mm and an internal diameter of 36.5 mm. The tube blank was subjected to a spheroidizing treatment consisting of holding it for 2 hours at 800° C. followed by cooling down to 650° C. at a rate of 10° C. per hour, so as to obtain a Brinell hardness of 240 HB. The tube blank was then cold rolled in order to obtain a seamless tube having an external diameter of 42.9 mm and an internal diameter of 22.7 mm.

Bearing races were cut and machined from the tube and then subjected to an oil-hardening treatment after austenization at 900° C. and annealing at 200° C. so as to obtain a structure containing 18% of residual austenite.

The indentation resistance was tested by means of tests of the butt-fatigue type under high hertzian stress using races which were pre-indented on the tracks by two symmetrically placed Vickers indentations and by measuring the spalling times of the races. Races according to the invention were thus compared with 100Cr6 races according to the prior art for indentations whose diagonals measured 267 μm and 304 μm. For both the races according to the invention and the races according to the prior art the hardness was 63 HRC.

The results were as follows:

|   | Size of the indents | |
|---|---------------------|---|
|   | 267 μm | 304 μm |
| invention | >269 hours | 252 hours |
| 100Cr6, prior art | 145 hours | 75 hours |

These results show that the races according to the invention have a more than doubled lifetime for significant indentations.

The steel according to the invention is particularly suitable for the manufacture of bearing races from seamless tubes, but it is also suitable for the manufacture of races, balls, rollers and needles from rolled bar or from wire. These components may be formed by hot or cold plastic deformation, or by machining.

French Patent Application 97 04092 is incorporated herein by reference.

What is claimed is:

1. Steel for components for bearings whose chemical composition comprises, by weight based on total weight:

0.9% ≦ C ≦ 1.5%

0.4% ≦ Mn ≦ 1.5%

0.75% ≦ Si ≦ 2.5%

0.2 ≦ Cr ≦ 2%

0% ≤ Ni ≤ 0.5%
0% ≤ Mo ≤ 0.2%
0% ≤ Al < 0.05%
S ≤ 0.04%
iron and impurities resulting from smelting, the composition furthermore satisfying the relationships:

$$Mn \leq 0.75 + 0.55 \times Si$$

$$Mn \leq 2.5 - 0.8 \times Si$$

said component having a structure consisting of a network of carbides, martensite and from 5% to 30% of residual austenite.

2. The steel as claimed in claim 1 wherein its chemical composition is such that:

0.8% ≤ Mn ≤ 1.2%
0.8% ≤ Si ≤ 1.7%.

3. The steel as claimed in claim 1, wherein its chemical composition is such that:

Si ≥ 1.2%.

4. The steel as claimed in claim 1, wherein its chemical composition is such that:

0.9% ≤ C ≤ 1.1%
1.3% ≤ Cr ≤ 1.6%.

5. The steel as claimed in claim 4, wherein its chemical composition is such that:

0.8% ≤ Mn ≤ 1.2%
0.8% ≤ Si ≤ 1.7%.

6. The steel as claimed in claim 4, wherein its chemical composition is such that:

Si ≥ 1.2%.

7. A process for the manufacture of a component for bearings, in which:

a semi-finished product made of steel according to claim 1 is provided;

the semi-finished product is formed by hot plastic deformation so as to obtain a product blank;

a spheroidizing treatment is carried out on the product blank, this treatment comprising heating to a temperature of between 750° C. and 850° C. followed by cooling, the maximum rate of which is 10° C./hour, down to 650° C. so as to obtain a structure having a hardness of less than 270 HV and comprising a fine dispersion of carbides, and optionally, forming by cold plastic deformation so as to obtain a product;

a section is cut from the product and formed by cold or hot plastic deformation, or by machining, so as to obtain a component blank for bearings; and the component blank is subjected to an isothermal hardening heat treatment or cooling after austenization between 800° C. and 950° C. and to an annealing heat treatment between 100° C. and 400° C. so as to obtain a component for bearings which has a structure whose hardness is between 58 HRC and 67 HRC and which consists of residual carbides, martensite and from 5% to 30% of residual austenite.

8. The process as claimed in claim 7, wherein said heat treatment is carried out at a temperature below 250° C.

9. The process as claimed in claim 7, wherein the product blank is a seamless tube blank and wherein said component is a seamless tube.

10. A seamless tube made of steel as claimed in claim 1.

11. A component for bearings, made of steel as claimed in claim 1, having a structure consisting of a network of carbides, martensite and from 5% to 30% of residual austenite.

12. The component as claimed in claim 11, which is a race.

* * * * *